(12) United States Patent
Shaikh

(10) Patent No.: US 8,360,653 B2
(45) Date of Patent: Jan. 29, 2013

(54) DOUBLE ROW, ANGULAR CONTACT BALL BEARING WITH TWO PLASTIC COMB CAGES WITH RETAINING TABS

(75) Inventor: Shakeel Shaikh, Stratford (CA)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 546 days.

(21) Appl. No.: 12/599,414

(22) PCT Filed: May 7, 2008

(86) PCT No.: PCT/EP2008/003636
§ 371 (c)(1),
(2), (4) Date: Nov. 9, 2009

(87) PCT Pub. No.: WO2008/138519
PCT Pub. Date: Nov. 20, 2008

(65) Prior Publication Data
US 2010/0215303 A1  Aug. 26, 2010

Related U.S. Application Data

(60) Provisional application No. 60/917,396, filed on May 11, 2007.

(51) Int. Cl.
F16C 33/40 (2006.01)
F16C 19/08 (2006.01)
F16C 33/58 (2006.01)

(52) U.S. Cl. ........ 384/523; 384/504; 384/512; 384/526; 384/531

(58) Field of Classification Search .................. 384/504, 384/507, 512, 516, 523, 526–527, 544, 539
See application file for complete search history.

(56) References Cited

U.S. PATENT DOCUMENTS

| 3,554,621 | A | * | 1/1971 | McAllister | 384/484 |
|---|---|---|---|---|---|
| 4,398,775 | A | * | 8/1983 | Hofmann et al. | 384/527 |
| 4,723,851 | A | * | 2/1988 | Troster et al. | 384/512 |
| 4,783,182 | A | * | 11/1988 | Caron et al. | 384/504 |
| 5,096,310 | A | * | 3/1992 | Meining et al. | 384/506 |
| 5,180,231 | A | | 1/1993 | Ueno et al. | |
| 5,199,801 | A | * | 4/1993 | Grehn et al. | 384/506 |
| 5,226,737 | A | * | 7/1993 | Sandy, Jr. | 384/544 |
| 5,261,752 | A | * | 11/1993 | Ouchi et al. | 384/448 |
| 5,564,839 | A | * | 10/1996 | Ouchi et al. | 384/448 |
| 5,695,289 | A | * | 12/1997 | Ouchi et al. | 384/448 |
| 5,863,124 | A | * | 1/1999 | Ouchi et al. | 384/448 |
| 6,045,267 | A | * | 4/2000 | Merklein et al. | 384/448 |
| 6,328,476 | B2 | * | 12/2001 | Nakamura et al. | 384/448 |
| 6,957,919 | B2 | | 10/2005 | Kern et al. | |
| 2001/0000713 | A1 | | 5/2001 | Nakamura | |
| 2007/0242914 | A1 | * | 10/2007 | Friedl et al. | 384/506 |

FOREIGN PATENT DOCUMENTS

| DE | 39 17128 XA | 11/1990 |
|---|---|---|
| DE | 40 37 270 XA | 5/1992 |
| DE | 41 07 976 XA | 9/1992 |
| DE | 94 12 260 X | 9/1994 |
| DE | 10 2004 013 803 X | 10/2005 |
| FR | 2 308 013 A | 11/1976 |
| FR | 2650353 A * | 2/1991 |
| JP | 04 013820 A | 2/1992 |

(Continued)

*Primary Examiner* — Marcus Charles
(74) *Attorney, Agent, or Firm* — Lucas & Mercanti, LLP; Klaus P. Stoffel

(57) ABSTRACT

Double row angular contact ball bearing (10) has split inner rings (18, 24) and two plastic comb snap cages (32, 44). The comb cage has retaining tabs (38, 50) which mate with retaining grooves (22, 28) in the split inner rings. These retaining tabs hold the inner rings into the bearing.

6 Claims, 4 Drawing Sheets

FOREIGN PATENT DOCUMENTS

| JP | 2002086040 A | | 10/2002 |
| JP | 2002286040 A | * | 10/2002 |
| JP | 2005265099 A | * | 9/2005 |
| JP | 2005273799 A | * | 10/2005 |

* cited by examiner

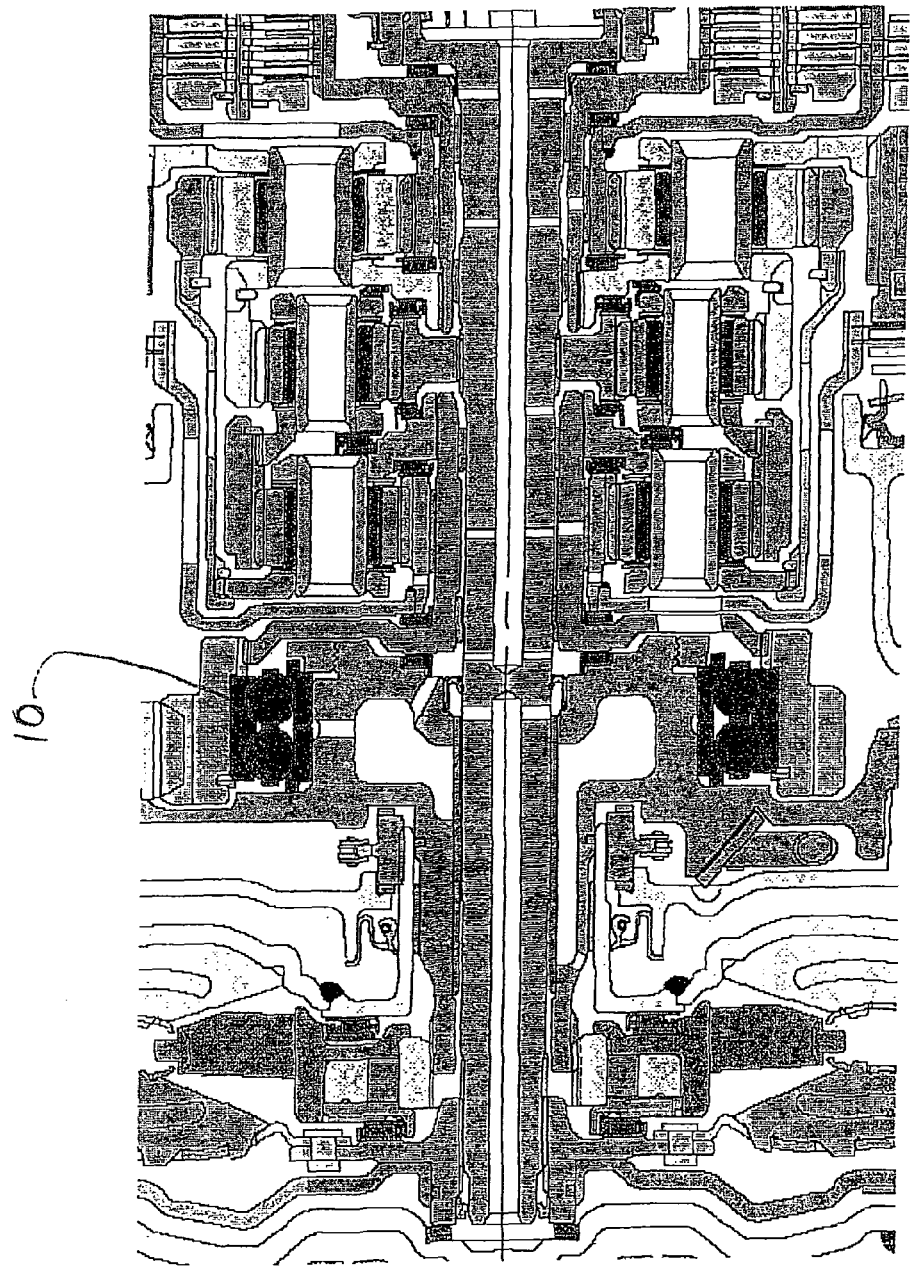

DOUBLE ROW, ANGULAR CONTACT BALL BEARING WITH TWO PLASTIC COMB CAGES WITH RETAINING TABS

CROSS-REFERENCE TO RELATED APPLICATIONS

This application is a 371 of PCT/EP2008/03636 filed May 7, 2008, which in turn claims the priority of US 60/917,396 filed May 11, 2007, the priority of both applications is hereby claimed and both applications are incorporated by reference herein.

FIELD OF THE INVENTION

This invention relates to ball bearings and, more particularly, to double row, angular contact ball bearings having plastic snap cages and a split inner ring.

BACKGROUND OF THE INVENTION

Double row angular ball bearings are known, see for example U.S. Pat. No. 6,957,919. Such ball bearings have a single outer ring with a pair of adjacent inwardly oriented raceways, a single inner ring with a pair of adjacent outwardly oriented raceways, and two ball crown rings with window type cages. In the '919 patent, lugs are used to mate with a groove in either the upper or lower ring to maintain the ball crown ring in either the inner or outer ring.

A drawback to such arrangements is the weight and the size associated with such cages. Since the cages employ a window which fully encircles the ball, the bearing must account for a portion of the cage that extends into the space between the two crown rings, thereby requiring a large axial spacing between adjacent cages.

One solution to the spacing and the weight associated with such a large cage is to employ plastic snap cages. Snap cages employ pockets for housing the balls rather than windows. Such plastic snap cages are known, see for example U.S. Pat. No. 6,416,230.

Double row angular contact ball bearings having split inner ring have been used to provide increased flexibility to the bearing. One of the drawbacks with ball bearings that have split inner rings and that do not employ snap cages is that the inner rings easily separate from the bearing until such time as the bearing is mounted for its intended use. One solution to the problem of the separation of the bearing is to employ sleeves around the bearing until such time as the bearing is to be mounted for its intended purpose. The problem with the sleeves is that when the sleeves are removed the bearing can become unassembled prior to its mounting. There is a need for a better arrangement in a bearing in order to avoid the separation of the split inner ring from the bearing and to avoid potential bearing damage during handling on an assembly line.

OBJECT OF THE INVENTION

It is the object of the invention to provide an improved double row angular contact ball bearing having plastic snap cages and a split inner ring that avoid the separation problem.

This and other objects of the invention will become more evident from the following description of the invention.

SUMMARY OF THE INVENTION

This invention achieves the above objects by using plastic snap cages that have retaining tabs and split inner rings that have retaining grooves. The retaining tabs of the cages lock into retaining grooves in the inner rings so as to hold the inner ring in the bearing. Such retaining tabs provide an axially inward and radially downward force onto the inner ring so as to hold the inner ring into the bearing. The retaining tabs lock into the retaining grooves of the inner ring when the inner ring is pushed into the bearing during assembly of the bearing.

More specifically, the invention can be defined as a double row, angular contact snap cage ball bearing comprising:

one outer ring having a first outer raceway axially adjacent a second outer raceway;

a first inner ring having a first inner raceway radially opposite the first outer raceway and a first retaining groove inwardly, axially adjacent the first inner raceway;

a second inner ring having a second inner raceway radially opposite the second outer raceway and a second retaining groove inwardly, axially adjacent the second inner raceway, the first retaining groove inwardly, axially adjacent the second retaining groove;

a first ball crown ring having a first plastic snap cage with a plurality of first pockets housing a set of first balls therein, the first balls running in the first outer raceway and the first inner raceway, and a plurality of first retaining tabs extending axially inward and radially downward to lock with the first retaining groove and hold the first inner ring in the bearing;

a second ball crown ring having a second plastic snap cage with a plurality of second pockets housing a set of second balls therein, the second balls running in the second outer raceway and the second inner raceway, and a plurality of second retaining tabs extending axially inward and radially downward to lock with the second retaining groove and hold the second inner ring in the bearing.

Each of the outer raceways has a land diameter that is the axial outer edge of the outer raceway. This land diameter retains the set of balls in the bearing.

Preferably, the first plastic snap cage and the second plastic snap cage are made from polyetheretherketones (PEEK) for high temperature applications. Nylon can be used for moderate temperature applications.

Preferably, one of each of the plurality of first retaining tabs is positioned between every other one of the plurality of the first pockets in the first ball crown ring and one of each of the plurality of the second retaining tabs is positioned between every other one of the plurality of the second pockets in the second ball crown ring. The positioning of the retaining tabs between every other pocket is preferred for cost saving and ease of manufacturing. Retaining tabs can also be positioned between each of the pockets depending on the need for such.

The first ball crown ring and the second ball crown ring can be in the same radial plane. Alternatively the first ball crown ring and the second ball crown ring can be in different radial planes.

The first balls and the second balls can have the same diameter. Alternatively, the first balls and the second balls can have different diameters.

More preferably, the ball crown rings have a rib onto which the bottom and sides of the pockets are attached. The open top of the pockets face axially inward in the bearing. Even more preferably, the rib is divided between a upper rib and a lower rib which are spaced radially apart from one another and which are fixed to the bottom and side walls of the pockets.

In the bearing of the invention, each of the balls extends inwardly, axially beyond the open top of the pockets. Additionally, each of the balls extends radially upward and downward beyond the bottom and side walls of the pocket so as to allow the balls to roll freely in the outer and inner raceways. This provides for better flow of lubricant and avoids sliding concerns.

Preferably, each of the retaining tabs does not extend axially inward beyond the ball of the open pocket.

These and other aspects of the invention may be more readily understood by reference to the following drawings and the detailed descriptions that follows.

BRIEF DESCRIPTION OF THE DRAWINGS

FIG. 1 illustrates a cross sectional view of the bearing of the invention;

DETAILED DESCRIPTION OF THE DRAWINGS

Figure 4:
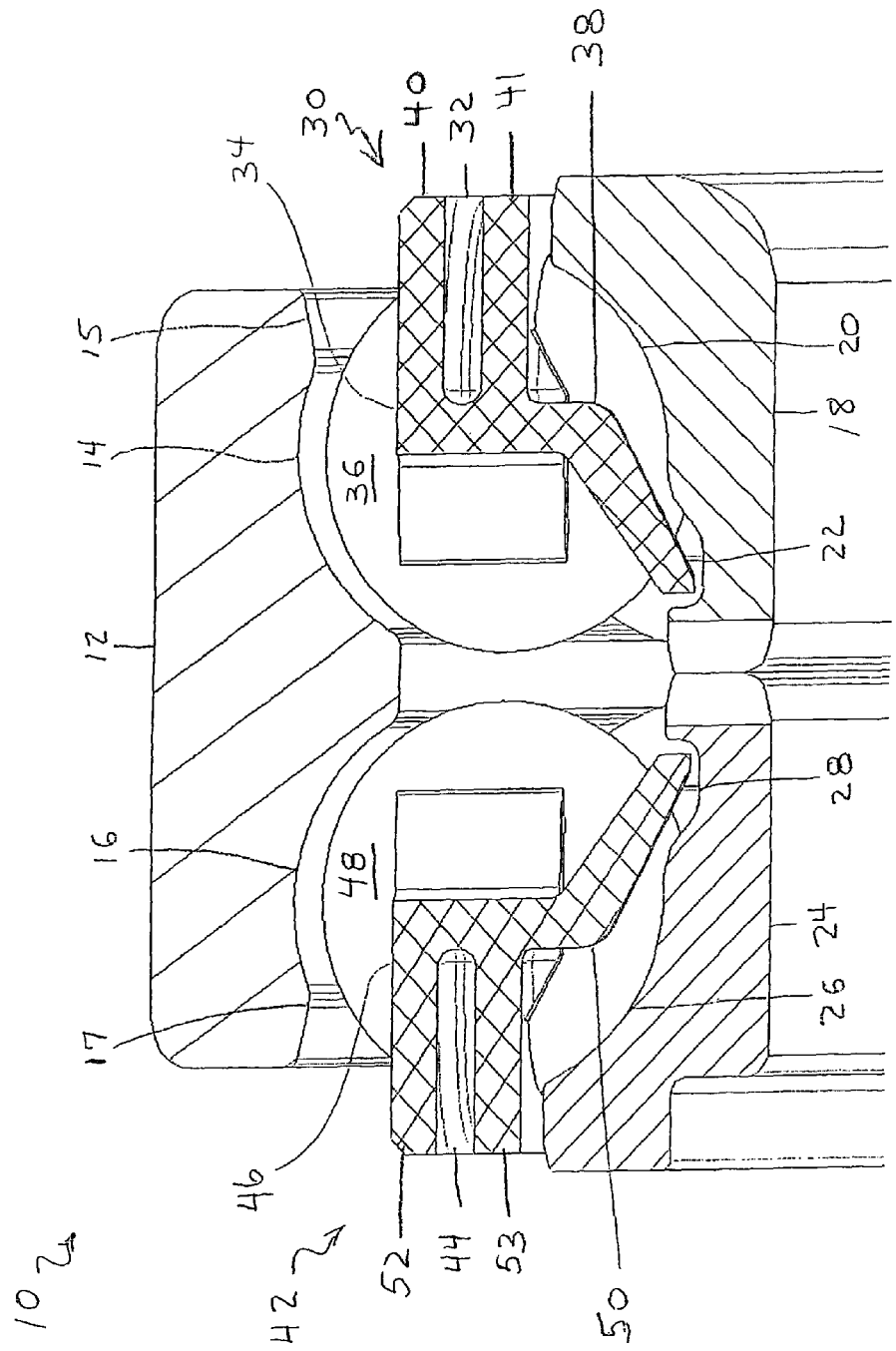
FIG. 4 illustrates a ball bearing of the invention in transfer gear of an automatic transmission.

FIG. 1 illustrates double row, angular contact snap cage bearing 10 with one outer ring 12 having first outer raceway 14 positioned axially adjacent second outer raceway 16. First land diameter 15 and second land diameter 17 are the axial outer edge of first outer raceway 14 and second outer raceway 16, respectively.

Opposite outer ring 12 is first inner ring 18 having first inner raceway 20 positioned radially opposite first outer raceway 14. First retaining groove 22 is positioned inwardly and axially adjacent first inner raceway 20.

Also opposite outer ring 12 is second inner ring 24 having second inner raceway 26 which is positioned radially opposite second outer raceway 16. Second retaining groove 28 is positioned inwardly and axially adjacent second inner raceway 26. As can be seen in FIG. 1, first retaining groove 22 is positioned inwardly, axially, adjacent to second retaining groove 28. It can also be seen in FIG. 1 that retaining grooves 22 and 28 are at a depth below the surface of their respective raceways in an axial direction.

Figure 2:
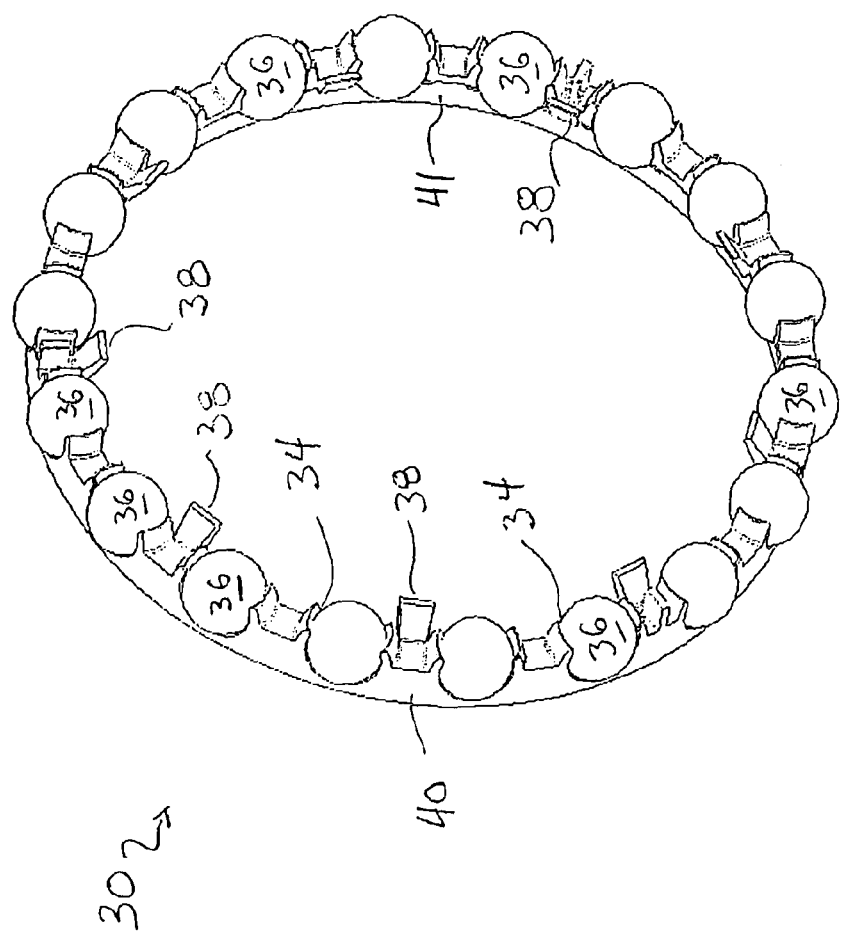
FIG. 2 is a perspective view of a ball crown ring of the invention.

Positioned between outer ring 12 and first inner ring 18 is a first ball crown 30. First ball crown 30 has first plastic snap cage 32 with a plurality of first pockets 34 for housing first balls 36 therein. First balls 36 run in first outer raceway 14 and first inner raceway 20. A plurality of first retaining tabs 38 are positioned between first pockets 34, as illustrated in FIG. 2. First retaining tabs 38 are oriented to extend axially inward and radially downward to lock or mate with first retaining groove 22. First ball crown 30 has a first upper rib 40 and a first lower rib 41 to support first pockets 34 and first retaining tabs 38.

Positioned between outer ring 12 and second inner ring 24 is second ball crown ring 42. Second ball crown ring 42 has second plastic snap cage 44 with a plurality of second pockets 46 and a plurality of second balls 48 which are housed in second pockets 46. Second balls 48 run in second outer raceway 16 and second inner raceway 26. A plurality of second retaining tabs 50 extend axially inward and radially downward to lock or mate with second retaining groove 28. Second ball crown 42 has second upper rib 52 and second lower rib 53 onto which second pockets 46 are affixed and onto which second retaining tabs 50 are affixed. Retaining tabs 38, 50 do not extend in an axial direction beyond their respective balls 36, 48.

FIG. 2 illustrates a ball crown ring, both ball crowns being essentially identical. Specifically FIG. 2 illustrates first ball crown ring 30 in which each one of first retaining tabs 38 are positioned between every other one of first pockets 34. In other words, there are two pockets 34 positioned between each retaining tab 38.

Figure 3:
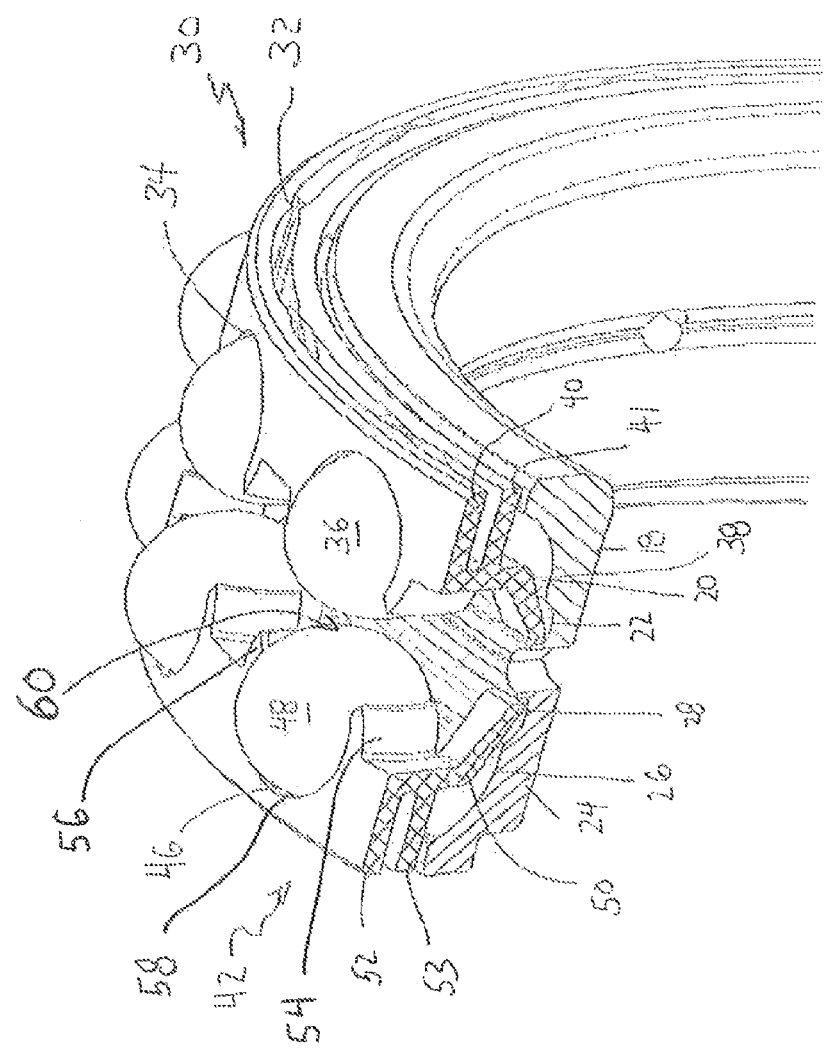
FIG. 3 is a perspective view of the bearing of the invention without the outer ring.

As illustrated in FIG. 3, first ball crown ring 30 has first upper rib 40 and first lower rib 41 which are radially spaced apart from one another. Likewise, second ball crown ring 42 has second upper rib 52 and second lower rib 53 which are spaced radially apart from one another. In both first ball crown ring 30 and second ball crown ring 42, the upper and lower rib attached to the side walls 54 and 56 and the bottom wall 58. of their respective pockets 34 and 46. Retaining tabs 38, 50 are affixed to their respective ribs 40, 41 and 52, 53. Each of the pockets 34 and 46 have open tops 60. Balls 36 and 48 extend axially inward beyond the open tops 60 of their respective pockets 34 and 46. The balls 36 and 48 also extend radially above and below the side walls 54, 56 and bottom wall 58 of their respective pockets 34 and 46.

Outer ring 12 and inner rings 18 and 24 are made of conventional metal (bearing steel) materials and designed in a conventional manner except for the fact that the inner rings have retaining grooves therein.

Balls 36 and 48 are made of conventional metal materials (bearing steel) in a conventional manner.

Plastic snap cages 32 and 44 are made of conventional plastic materials used for snap cages and, more preferably, from polyetheretherketones (PEEK). The plastic cages are made in a conventional manner using conventional molds except for the fact that the molds provide the retaining tabs 38 and 50.

In order to assemble the bearing, both the first and the second ball crown rings are pushed into the outer ring. Next, the first and second inner rings are press fitted into the bearing such that the retaining tabs couple with the respective inner grooves during the pressing of the inner rings into the bearing, the retaining tabs flex and lock into the retaining grooves. Because of the press fit between the ball crown rings and the outer ring, the ball crown rings are retained in the bearing. Because of the inward pressure exerted by the retaining tabs onto the retaining grooves, the inner rings are retained in the bearing. Thus, all three components of the bearing, the outer ring, the ball crown rings and the inner rings are maintained as a solid unit. As can be understood, the retaining tabs exert an axially inward and radially downward force against the inner rings to retain the inner rings in the bearing.

FIG. 4 illustrates ball bearing 10 in an automotive transfer gear of an automatic six speed transmission.

REFERENCE NUMERALS 10 ball bearing
12 outer ring
14 first outer raceway
15 first land diameter
16 second outer raceway
17 second land diameter
18 first inner ring
20 first inner raceway
22 first retaining groove
24 second inner ring
26 second inner raceway
28 second retaining groove
30 first ball crown ring
32 first plastic snap cage
34 first pockets
36 first balls
38 first retaining tabs 40 first upper rib
41 first lower rib
42 second ball crown ring
44 second plastic snap cage
46 second pocket
48 second balls
50 second retaining tabs
52 second upper rib
53 second lower rib

The invention claimed is:

1. A double row, angular contact snap cage ball bearing comprising:
   one outer ring having a first outer raceway axially adjacent to a second outer raceway;
   a first inner ring having a first inner raceway radially opposite said first outer raceway and a first retaining groove inwardly, axially adjacent to said first outer raceway;
   a second inner ring having a second inner raceway radially opposite said second outer raceway and a second retaining groove inwardly, axially adjacent to said second inner raceway, said first retaining groove inwardly axially adjacent said second retaining groove;
   a first ball crown ring having a first plastic snap cage with a plurality of first pockets housing a set of first balls therein, said first balls running in said first outer raceway and said first inner raceway, and a plurality of first retaining tabs extending axially inward and radially downward to lock with said first retaining groove to hold said first inner ring in the bearing;
   a second ball crown ring having a second plastic snap cage with a plurality of second pockets housing a set of second balls therein, said second balls running in said second outer raceway and said second inner raceway, and a plurality of second retaining tabs extending axially inward and radially downward to lock with said second retaining groove and hold said second inner ring in the bearing,
   wherein the first ball crown ring comprises a first rib, each of said first pockets have a bottom wall affixed to the first rib and an axially inwardly open top, and each of said first retaining tabs extending from said first rib, and
   wherein said second ball crown ring comprises a second rib, each of said second pockets have a bottom wall affixed to the second rib and an axially inwardly open top, and each of said second retaining tabs extend from said second rib.

2. The bearing of claim 1, wherein said first plastic snap cage and said second plastic snap cage are made from polyetheretherketone.

3. The bearing of claim 1, wherein one of each of said plurality of first retaining tabs is positioned between every other one of plurality of first pockets;
   and one of each of said plurality of said second retaining tabs is positioned between every other one of said plurality of second pockets.

4. The bearing of claim 1 wherein said first ball crown ring and said second ball crown ring are in a same radial plane.

5. The bearing of claim 1, wherein said first balls and said second balls have a same diameter.

6. The bearing of claim 1, wherein each of said first balls extend inwardly axially beyond the open top of said first pockets, and said second balls extend inwardly axially beyond the open top of said second pockets.

* * * * *